US008449369B2

(12) United States Patent
DeLise

(10) Patent No.: US 8,449,369 B2
(45) Date of Patent: May 28, 2013

(54) METHOD FOR ELECTRONIC GAMING INCLUDING PLAYER-SELECTED GAME SYMBOLS AND PLAYER-SELECTED WINNING SYMBOLS

(76) Inventor: Anthony DeLise, Reno, NV (US)

( * ) Notice: Subject to any disclaimer, the term of this patent is extended or adjusted under 35 U.S.C. 154(b) by 0 days.

(21) Appl. No.: 13/366,258

(22) Filed: Feb. 3, 2012

(65) Prior Publication Data

US 2012/0202576 A1 Aug. 9, 2012

Related U.S. Application Data

(60) Provisional application No. 61/439,365, filed on Feb. 3, 2011.

(51) Int. Cl.
*A63F 9/24* (2006.01)
*A63F 13/00* (2006.01)

(52) U.S. Cl.
USPC .................... 463/16; 463/13; 463/17; 463/20

(58) Field of Classification Search
USPC ............... 463/11–13, 16–20, 25, 29; 273/292
See application file for complete search history.

(56) References Cited

U.S. PATENT DOCUMENTS 1,527,929 A * 2/1925 Simons ......................... 273/139
4,560,161 A * 12/1985 Hamano ......................... 463/13
5,100,139 A * 3/1992 Di Bella ........................ 273/292
5,882,259 A * 3/1999 Holmes et al. .................. 463/13
6,033,306 A * 3/2000 De Souza ........................ 463/18
6,149,157 A * 11/2000 Suan ............................ 273/292
6,331,143 B1 * 12/2001 Yoseloff ......................... 463/18
6,368,212 B1 * 4/2002 Moody ........................... 463/13
6,457,714 B1 * 10/2002 Feola ............................ 273/274
6,568,677 B2 * 5/2003 Brenner .................... 273/144 B
6,572,471 B1 * 6/2003 Bennett ........................... 463/16
6,592,457 B1 * 7/2003 Frohm et al. ..................... 463/16
7,223,171 B2 * 5/2007 Colin et al. ...................... 463/11
7,341,513 B2 * 3/2008 Cuddy et al. ..................... 463/20
8,092,292 B1 * 1/2012 White ............................. 463/13
2002/0119813 A1 * 8/2002 Colin et al. ...................... 463/11
2003/0017867 A1 * 1/2003 deKeller ......................... 463/18
2003/0178770 A1 * 9/2003 Stewart ......................... 273/269
2005/0054415 A1 * 3/2005 Kaminkow et al. ............. 463/16
2005/0085286 A1 * 4/2005 Muskin ........................... 463/13
2005/0242505 A1 * 11/2005 Reiner et al. .................. 273/292
2006/0035700 A1 * 2/2006 Van Asdale ...................... 463/19
2006/0287043 A1 * 12/2006 Englman et al. ................ 463/16

* cited by examiner

*Primary Examiner* — Milap Shah
(74) *Attorney, Agent, or Firm* — John D. Long

(57) ABSTRACT

One possible embodiment of the invention could be a gaming methodology comprising the following steps but not necessarily in the order shown, providing an electronic gaming system for playing one or more games of chance, the electronic gaming system utilizing a user interface to allow at least one player to communicate with the electronic gaming system; providing through the user interface a visual presentation to the player of a set of spaces with each space being assigned a gaming symbol used in the play of game, no two or more spaces having the same gaming symbol; selecting by a player, through the set of spaces, a number of gaming symbols for use as winning gaming symbols to determine whether the player has won a game; and selecting by the electronic gaming system of a number of gaming symbols for use by the player for the play of the game.

19 Claims, 7 Drawing Sheets

METHOD FOR ELECTRONIC GAMING INCLUDING PLAYER-SELECTED GAME SYMBOLS AND PLAYER-SELECTED WINNING SYMBOLS

CROSS-REFERENCES TO RELATED APPLICATIONS

This application claims the benefit under 35 U.S.C. §119 (e) of U.S. Provisional Patent Application No. 61/439,365, filed on Feb. 3, 2011, the contents of which are relied upon and incorporated by reference.

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention generally relates to methodologies for electronic gaming. More particularity, the present invention generally relates to those methodologies of electronic gaming and wagering that allow a player to substantially select winning gaming symbols in game that are used to identify whether or not if the player has won.

BACKGROUND

Playing an electronic or computerized versions of games (e.g., such as those for Lottery, Keno, BINGO or playing cards types) may start when a player first places a wager (although it is possible to play such games without wagering) with the electronic gaming system (e.g., a combination of the game's software program(s); server(s) or computer system (s); and associated electronic peripherals). After this initial wagering is generally completed, the electronic gaming system may select (e.g., through a pseudo-random symbol generator or other suitable means) one or more gaming symbols (e.g., a hand of cards) from a set of gaming symbols (e.g., a deck of cards) as substantially used in the such play of the game. The electronic gaming system may then display or otherwise communicate some or all of those selected-gaming symbols. The gaming computer system may then also compare the selected gaming symbols with an established payout table or other suitable means to establish if a win for the gaming symbols assigned to the player, if any, has occurred, and determine a corresponding reward for the player for such a win.

The computerized playing card-type games (such as video Poker, video Blackjack, and the like) may utilize the ranking of the computer-selected gaming symbols to determine the total value of the computer-selected gaming symbols (e.g., overall value of the player's hand). This ranking of the player's hand is then generally used to determine if the game and/or a wager has been won by the player. For the game play, the electronic gaming system generally deals the player a set number of gaming symbols (e.g., a hand of cards.) If the player further selects or otherwise activates within the game operation one or more playing options to change one or more game-selected symbols (e.g., any card or cards contained in the hand), the electronic gaming system further randomly generates a new selection of one or more new replacement gaming symbols (e.g., replacement cards) for the player's hand (selected-gaming symbols.) Once the player has indicated to the electronic gaming system that the player is satisfied with the originally selected gaming symbols or their replacements (or the electronic gaming system otherwise limits the employment of such randomly-selected replacement gaming symbols or cards) the electronic gaming computer system concludes that particular game play by comparing the set of gaming symbols assigned to (e.g., held by) the player with the system's payout table database. Comparison with the database (which may identify one or more sets of gaming symbols as winning sets of gaming symbols) may identify if the set of assigned gaming symbols of the player's particular "hand" constitutes a winning set of gaming symbols. If there is such a match, the electronic gaming system may further utilize the database to may reward the player accordingly.

In grid based games (lottery, BINGO, Keno games), the player selects or causes to be randomly-selected (e.g., by the electronic gaming system in a "quick-pick" fashion) one or more gaming symbols that the player hopes will match one or more winning gaming symbols later randomly selected by the electronic gaming system. For example, in BINGO, the player is given one or more computerized BINGO card formats (e.g., grids containing gaming symbols) upon which the game is played while in Keno, the player (or the electronic gaming system) selects gaming symbols contained in a grid that are to be assigned to the player for game play.

The electronic gaming system then could randomly select one or more gaming symbols from the set of gaming symbols used in the play of the game to be the winning gaming symbol (s) as used to establish one or more wins have occurred for any of the participating players. A win is established by comparison of those gaming symbols assigned to the player for play of the game (e.g., gaming symbols of a Bingo Card) with the game's randomly-selected winning gaming symbols to see if enough of a matchup (or in the case of Bingo card, a certain predetermined pattern of matching gaming symbols) has occurred to qualify as a win. The electronic gaming system then generally matches any such wins against a payout table database or other suitable means to determine the amount of reward or payout to be given to a winning player(s).

It could be observed that there may be a current stagnation in player involvement in electronic gaming, which inhibits new player participation in such activities. The gaming industry in an attempt to increase the excitement surrounding such games (and hence increasing player participation in such games, appears to concentrates more on continually introducing new games with new playing formats and features rather than possibly improving or increasing the player involvement in the determination of winning for electronic gaming.

What could be needed is a new gaming methodology wherein the player is given the ability, if not given at least the impression, of having greater control over more aspects of the determination of the winning of the game (and a wager if such is placed). Providing such a control to the player could increase, for the player, the excitement in playing such a game. This gaming methodology could allow the player to personally select one or more of the gaming symbols that are used in the game play as those winning gaming symbols used to determine whether a winning event has occurred in a particular play of a game. Providing such a control to the player could increase, for the player, the excitement and a desire to participate in such a game.

One possible solution could be a gaming methodology wherein the game while allowing the player to select winning gaming symbols, then randomly picks gaming symbols that are then used by the player for that particular play of the game.

Another possible solution, while allowing a player to select winning gaming symbols, could provide a means by which the player selects one or more of the gaming symbols as used by the player for that play of the game.

SUMMARY OF ONE EMBODIMENT OF THE INVENTION

Advantages of One or More Embodiments of the Present Invention

The various embodiments of the present invention may, but do not necessarily, achieve one or more of the following advantages:

to substantially provide a gaming methodology whereby the player takes a more active role in the determination of whether game has been won;

the ability to increase player enjoyment and excitement in playing an electronic game by allowing the player to select the winning gaming symbols used to determine the existence of a win of the game as well as a winning wager;

to substantially provide a gaming methodology whereby a game operation provides for player-selected winning symbol (s) and the random selection of a player's gaming symbols as used in the particular play of the game, wherein the indentify or the value of a player-selected winning symbol(s) is not disclosed to the player until after the player's selection of that particular winning symbol have been made;

to substantially provide gaming methodology wherein the player selects the gaming symbols the player wants to use in the play of game as well as selects one or more winning game symbols used to determine a win in the game, the electronic gaming system not disclosing to the player the identity or value of player-selected winning gaming symbols until after all the winning gaming symbols for the particular play of the game have been selected;

to provide a gaming methodology that may allow a player to pick gaming symbols from a set of spaces to which the gaming symbols have been assigned, the methodology rearranging the assignment of gaming symbols to a set of spaces to allow the player to subsequently select the winning gaming symbols without knowing the value or identity of the winning gaming symbols at the time of their selection; and the ability to have an electronic gaming system select those gaming symbols a player is to use in a play of game while the player selects one or more gaming symbols to be the winning gaming symbols, the randomly-selected gaming symbols are not revealed to the player until after the player has selected the one or more winning gaming symbols for a particular play of a game.

These and other advantages may be realized by reference to the remaining portions of the specification, claims, and abstract.

Brief Description of One Embodiment of the Present Invention

One possible embodiment of the invention could be a gaming methodology comprising the following steps but not necessarily in the order shown, providing an electronic gaming system for playing one or more games of chance, the electronic gaming system utilizing a user interface to allow at least one player to communicate with the electronic gaming system; providing through the user interface a visual presentation to the player of a first set of spaces with each space being assigned a gaming symbol used in the play of game, no two or more spaces having the same gaming symbol; selecting by a player, through the first set of spaces, a number of gaming symbols for use as winning gaming symbols to determine whether the player has won a game; and selecting by the electronic gaming system of a number of gaming symbols for use by the player for the play of the game.

Another possible embodiment of the invention could be a gaming methodology comprising of the following steps but not necessarily in the order shown, providing an electronic gaming system for playing one or more games of chance, the electronic gaming system utilizing a user interface to allow at least one player to communicate with the electronic gaming system; providing through the user interface a first set of spaces and a set of gaming symbols for the play of game, each gaming symbol being assigned to a respective space; no two or more of spaces having the same gaming symbol; selecting by a player, through the first set of spaces, a number of gaming symbols used by the system as winning gaming symbols to determine whether the player has won a game; reassigning the set of gaming symbols to the first set of spaces wherein each space has a respective gaming symbol and no two or more spaces have the same gaming symbol; selecting by the player, using the reassigned first set of spaces, a definite number of gaming symbols for use as winning gaming symbols, neither the identity nor value of the gaming symbols so selected by the player being disclosed to the player until after completion of the winning gaming symbol selection.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention 10 could comprise of game methodologies 100, 200 wherein the player (not shown) has greater role in determine the winning of a game (and a wager if so placed) as used with a variety of electronic games. The invention 10 can be used in those embodiments where gaming and wagering occur together or where there is only gaming and no wagering (e.g., certain internet sites providing gaming, but therein no actual wager is occurring.)

Figure 1:
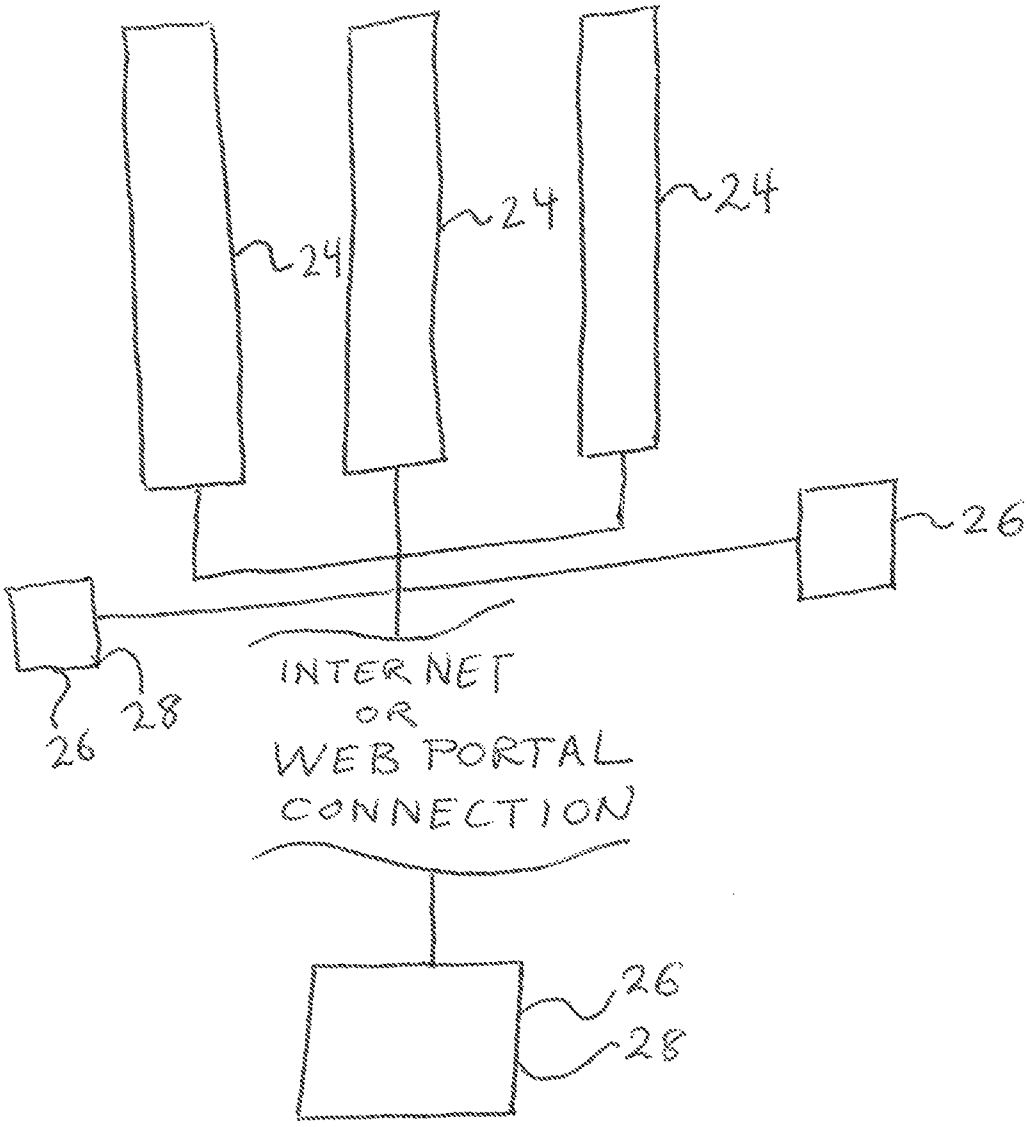
FIG. 1 could substantially show a schematic for one embodiment of the electronic gaming system used for the invention.

As generally shown in FIG. 1, the invention 10 could be used with an electronic gaming system 20 for playing and wagering upon one or more games of chance. The system 20 could comprise of suitable electronic gaming hardware 22 having CPU capability in the form of one or more computers/servers 24 (e.g., networked together) connected with one or more associated electronic peripherals, such as printer (not show), monetary/credit card reader (not show) and a one or more user interfaces (e.g., touch screen) 26, the user interface to allowing a player (not shown) to interface or otherwise communicate with the electronic gaming system 20. The player could play the game (and place wagers on the outcome of the game) through one or more user interfaces 28 connected with the system 20. The user interface 28 could provide various visual presentations and other stimuli to communicate gaming and wagering information from the system to the player(s) while also accepting information and data from the player(s) regarding gaming, wagering, and other matters to be processed by the electronic gaming system 20. The electronic gaming system 20 could have the capacity to store, run, and otherwise process data through one or more software programs for operating at least one game of chance (and in some embodiments associated wagering.)

It should be noted that the electronic gaming system 20 could range in complexity to self-contained handheld device with sufficient computing ability and user interface to be capable of playing games to larger, more complex electronic gaming systems 20 as employed by a gaming establishments such as casinos (e.g., with the one or more servers remotely located from user interfaces and the gaming establishment) to internet gaming institutions wherein the customers connect their user interfaces through the web portal to access the internet gaming institutions gaming servers and alike.

Figure 2:
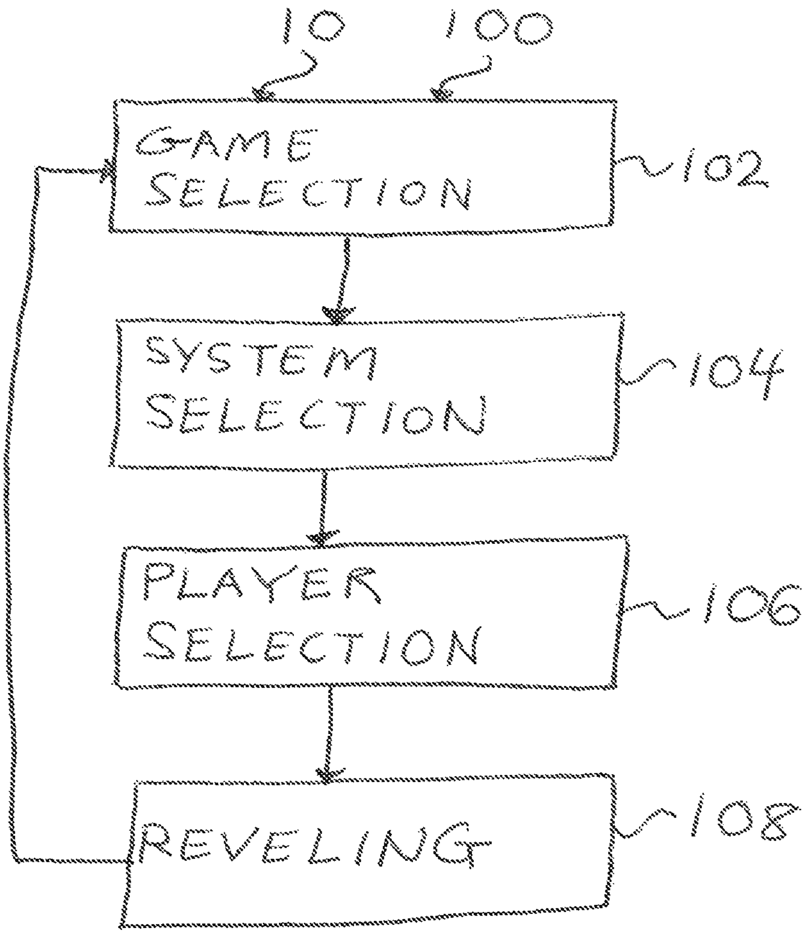
FIG. 2 could substantially show a flowchart for one embodiment of invention wherein the player selects the winning gaming symbols while electronic gaming system selects those gaming symbols to be used by the player for the play of the game.

As substantially shown in FIG. 2, one possible embodiment of the invention 20 could be a process or methodology 100 that allows the player, as part of the game play, to select one or more winning gaming symbols that the electronic gaming system 20 could utilized to determine if the player has won the game and/or wager while allowing the electronic gaming system 20 to select those gaming symbols which the player will utilize in the play of the game. The process 100 could commence with the first step 102, game selection/wager placement.

In this step 102, game selection/wager placement, a player could first decide on which game to play (e.g., if the electronic gaming system provides for one or more games to be played) and then appropriately interact (via the user interface) with the electronic gaming system to play the selected game and then, if system provides for wagering, begin to place one or more wagers for the play of the selected game. The electronic gaming system could initially present to the player, through the user interface, a set of wagering instructions to substantially prompt the player to select a wager type; selection of wager option(s); placement of wager amount(s), and like. After generally placing on or more wagers, the system could then generally commence the start of the selected game play. At this point, depending on game previously selected by the player, the process 100 could progress to step 104, the system selects gaming symbols.

In this step 104, the system selects gaming symbols, the electronic gaming system could select (e.g., randomly) from all the gaming symbols available for play of the game, those gaming symbols that are allotted to the player for use in that particular play of the game (e.g., such as the hand of playing cards being used by the player.) At this time, the electronic gaming system-selected gaming symbols to be used by the player in the play of the game would generally not be disclosed to the player but could have an undistinguished representation of each selected gaming symbol through the interface. For example, if the game being played is an electronic version of a playing card game, each of the system-selected gaming symbols (e.g., playing cards) could be displayed to the player through the interface with only the backs of the cards (e.g. an image of the cards face-down.) The electronic gaming system at this time generally would not disclose to the player the identity or face value of those electronic gaming system-selected gaming symbols (e.g., playing cards) assigned to that player for use in play of the game.

If a version of this embodiment allows the player to replace a previously system-selected gaming symbols used by the player in the play of the game (e.g., discarding a previously system-selected paying card) the electronic gaming system could at this time pick (e.g., randomly) one or more replacement gaming symbols (e.g., playing cards) for the player to use in the play of the game.

Once the system has generally completed its random-selection of gaming symbols and assigned them to the player for that game play, the process 100 could proceed to the next step 106, player selection of winning gaming symbols.

In step 106, player selection of winning gaming symbols, the electronic gaming system could present to the player, through the user interface, a visual representation of a set of spaces (e.g., that may be demarcated as squares [or the like] and generally arranged in a grid or other suitable format.) Generally, the electronic gaming system could assign all the gaming symbols available for use in the game to respective spaces (so that no gaming symbol is repeated within the spaces so that each space has its own unique gaming symbol) and communicate same (e.g., visually show or otherwise present the display) to the player. In this manner, all the gaming symbols (as available for game play) are presented to the player for the player's selection as one or more winning gaming symbols.

In such an example, for a playing card embodiment such as poker, this display could visually present to the player imagery depicting all the cards of a deck of player cards (generally minus the joker cards, which generally are not used in poker) so that the player is aware of the value and/or identity of the gaming symbols. The invention 10 could further organize this presentation of gaming symbols in a format that is easy for the player to understand and use. For example, a playing card game embodiment could have a visual presentation wherein the gaming symbols (e.g., playing cards) may assigned a first set of spaces (e.g., a grid of demarcated squares), first by suits, then each suit could be organized in order by progressive card face value. The player could then select one or more such presented gaming symbols to be used as winning gaming symbols in the play of the game.

An example of this could be the player touching an area on a user interface/touch screen corresponding to visually presented space (e.g., as demarcated square within a grid) with its assigned gaming symbol being a gaming symbol that the player wants to be used as a winning gaming symbol for that particular game play. Those gaming symbols so selected by the player could then be used by the electronic gaming system to determine if a player has won the play of the game and/or won a wager(s) and if so the reward associated with such as win.

Depending on the rules of the particular game being played through the invention 10, the electronic gaming system could be programmed to limit the player's choices of gaming symbols as well as limit the number of winning gaming symbols be selected by the player while the electronic gaming system picks the remaining winning gaming symbols.

It should be noted that the invention 10 could function just as well if step 104, the system selects gaming symbols followed step 106 player selection of winning gaming symbols.

After the winning gaming symbols have substantially selected, the process could continue onto the next step 108, revealing of system-selected gaming symbols.

In step 108, revealing of system-selected gaming symbols, the process 100 could then generally accomplish two actions: reveal to the player the set of gaming symbols previously selected (by the system) for use by the player as well as comparing those previously-selected game play gaming symbols with the player-selected winning gaming symbols to determine if there is one or more matches of gaming symbols between the two sets. If there one or more such matches occurs, then electronic gaming system could further compare the matched set(s) with a payout table means or database to determine if the game (e.g., and wager) has been won. If the game (e.g., and wager) has been won been won, the system, again pursuant to the payout table mean, could suitably credit the player (e.g., with the suitable winnings or reward(s).) The electronic gaming system could then reset (e.g., return to step 102) to allow the player to continue to play the game (or another game) and, as the case may be, wager accordingly. The player in could also decide to stop gaming (e.g., stop using the invention 10.)

Figure 3:
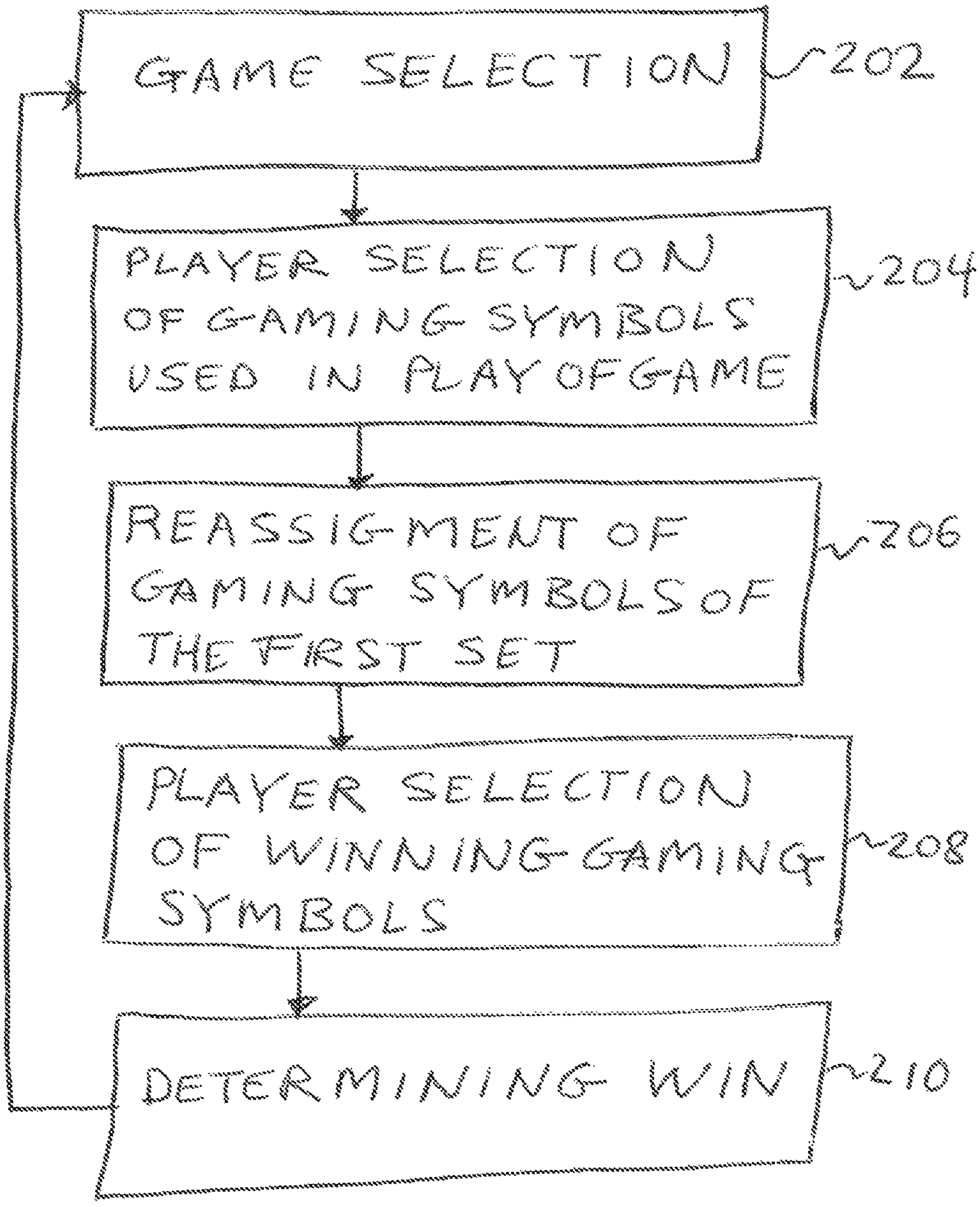
FIG. 3 could substantially show a flowchart for another embodiment of invention wherein the player selects both the winning gaming symbols and gaming symbols for the use by the player in the play of the game.

As substantially shown in FIG. 3, another possible embodiment of the invention 10 could be another gaming methodology or process 200 wherein the player selects both winning gaming symbols as well as those gaming symbols assigned to player for use in play of the game. In this embodiment, the process 200 could start at step 202, game selection/wager placement. In this step 202, game selection/wager placement, a player again could first decide on which game to play (e.g., if the electronic gaming system provides for one or more games to be played) and then appropriately interact (via the user interface) with the electronic gaming system to play the selected game and then, if electronic gaming system provides for wagering, begin to place one or more wagers for the play of the selected game. The electronic gaming system could initially present to the player, through the user interface, a set of wagering instructions to substantially prompt the player to select a wager type; selection of wager option(s); placement of wager amount(s), and like. After generally placing on or more wagers, the electronic gaming system could then generally commence the start of the selected game play. At this point, depending on game previously selected by the player, the process 200 could progress to step 204, player selection of gaming symbols used in play of the game.

In this step 204, player selection of gaming symbols used in play of the game, the player can select from all of the available gaming symbols for the game, those gaming symbols with which the player wishes to use in the play of the game. In one possible version of this embodiment, the electronic gaming system may present to the player (e.g., a visual display through a user interface/touch screen) all of the gaming symbols that can used in the play of the game. The gaming symbols may again be organized using a set (e.g., a grid) of spaces (e.g., demarcated squares) with each space displaying its own unique gaming symbol that is not repeated or assigned to any other such square. The value or identity of each such gaming symbol being also displayed to or otherwise known by the player. The presentation may be in an order easily understood and used by the player, such as organizing the gaming symbols (e.g., playing cards) by suites, then each suite by progressive order by face value.

The player can then select from that displayed set of gaming symbols, those gaming symbols that the player wishes to use in that particular play of the game.

In the video poker embodiment of the invention 10, however, the player does not know the identity and value of gaming symbols as the player selects those gaming symbols for game play of the player until after their selection is completed.

Once this selection is done, the process 200 can generally proceed to the step 206, reassignment of gaming symbols.

In this step 206, reassignment of gaming symbols, the electronic gaming system may first cause the presentation of the first set of spaces (e.g., a grid with demarcated squares) to change wherein the identity or value of the gaming symbols from the first set of spaces is no longer visible or known to the player. Secondly, the electronic gaming system may then reassign (e.g., randomly) all the gaming symbols within the first set of spaces. This re-assignment, in a order that may be different from the initial presentment of the set of first spaces to the player, again associates one gaming symbol with a respective space with the first set so that each space has its own unique gaming symbol that is not found in another such space. During this reassignment portion of this step, the electronic gaming system continues to generally not allow the disclosure to the player of the identity or value of a particular gaming symbol as assigned to its respective space. Once the reassignment of gaming symbols within the first set of spaces is completed, the process 200 can continue onto step 208, player selection of winning gaming symbols.

In step 208, player selection of winning gaming symbols, the player may now select (e.g., touching the space on the touch screen) one or more spaces of first set as reassigned (e.g., squares of the grid) to pick one or more winning gaming symbols without knowing the identity or value of the winning gaming symbol associated with the selected space. Once the player completes the selection of a space, the electronic gaming system substantially allows the associated gaming symbol (e.g., the winning gaming symbol) value and/or identity to be revealed to the player. The player continues to repeat this process until the winning gaming symbols are all selected (e.g., number of winning gaming symbols as set by the game.) In another version of the invention, the player first picks one or more, but not all the winning gaming symbols allowed for the game after which the electronic gaming system causes the selection of the remaining number of the winning game symbols.

If a version of the embodiment allows the player during this step to discard previously-selected gaming symbols (e.g., playing cards) selected by the player for use in the play of the game, the electronic gaming system upon such discard could then cause the selection (e.g., randomly, although the selection could utilize a non-disclosed pattern could also be used) of a replacement gaming symbol(s) for use by the player in the play of the game.

If the electronic gaming system does not automatically select replacement gaming symbols, it could allow the player to make the selection of gaming symbols. The electronic gaming system could again provide the player with a presentation of the set of gaming symbols randomly assigned to set of spaces (e.g., grid with demarcated squares) with no two spaces having the same gaming symbol. The presentation could be displayed so that the values or identity of the gaming symbols would not be disclosed to the player at this time. The player could make its selection of replacement gaming symbols for discarded gaming symbols by touching a desired space (e.g., demarcated square of the grid) on the user interface (e.g., touch screen.) The player could repeat this selection process until the player has completed its selection of the replacement gaming symbol(s). At that time, the invention could generally then disclose the value/identity of the selected replacement gaming symbols (e.g. replacement playing card(s)) to the player.

After all the required winning gaming symbols and replacement gaming symbols have been properly selected, the process 100 could proceed to the next step 210, determination of winning matches.

In step 210, determination of winning matches, the electronic gaming system could compare the set of selected winning gaming symbols with the set of selected gaming symbols used in the play of the game to determine if the winning criteria for the game has been met (e.g., has there occurred one or more matches of gaming symbols between the two sets.) If such match(es) occurred, the electronic gaming system could compare the match(es) with a payout table means or database to determine if the game has been won. If a wager(s) has (have) been placed and won, the electronic gaming system, again pursuant to the payout table mean, could pay out or credit the player with the suitable rewards or winnings.

After concluding the play of the particular game, the electronic gaming system could then reset (e.g., return to step 202) to allow the player to continue to play the same game again (or another game) and, as the case may be, wager accordingly. The player could also decide to stop gaming (e.g., stop using the invention.)

In one or more versions of the invention, the invention could further incorporate a timer function within the gaming software of the electronic gaming system, wherein as the player is making gaming symbol selections, whether for gaming symbols used in the play of the game or for winning gaming symbols, the player is given a certain amount of time to complete the selection. Failure of the player to complete either (or both) selections within time allotted by electronic gaming system could result in a limitation of or a reduction in the number of selection of gaming symbols to be used for the game play; could result in having the electronic gaming system make the rest of the gaming symbol selections for the player; or other suitable terms. Such a timing function could be displayed to the player in the manner of countdown or the like to add to the excitement as well as providing for better management of the game.

Playing Cards Version

Figure 4:
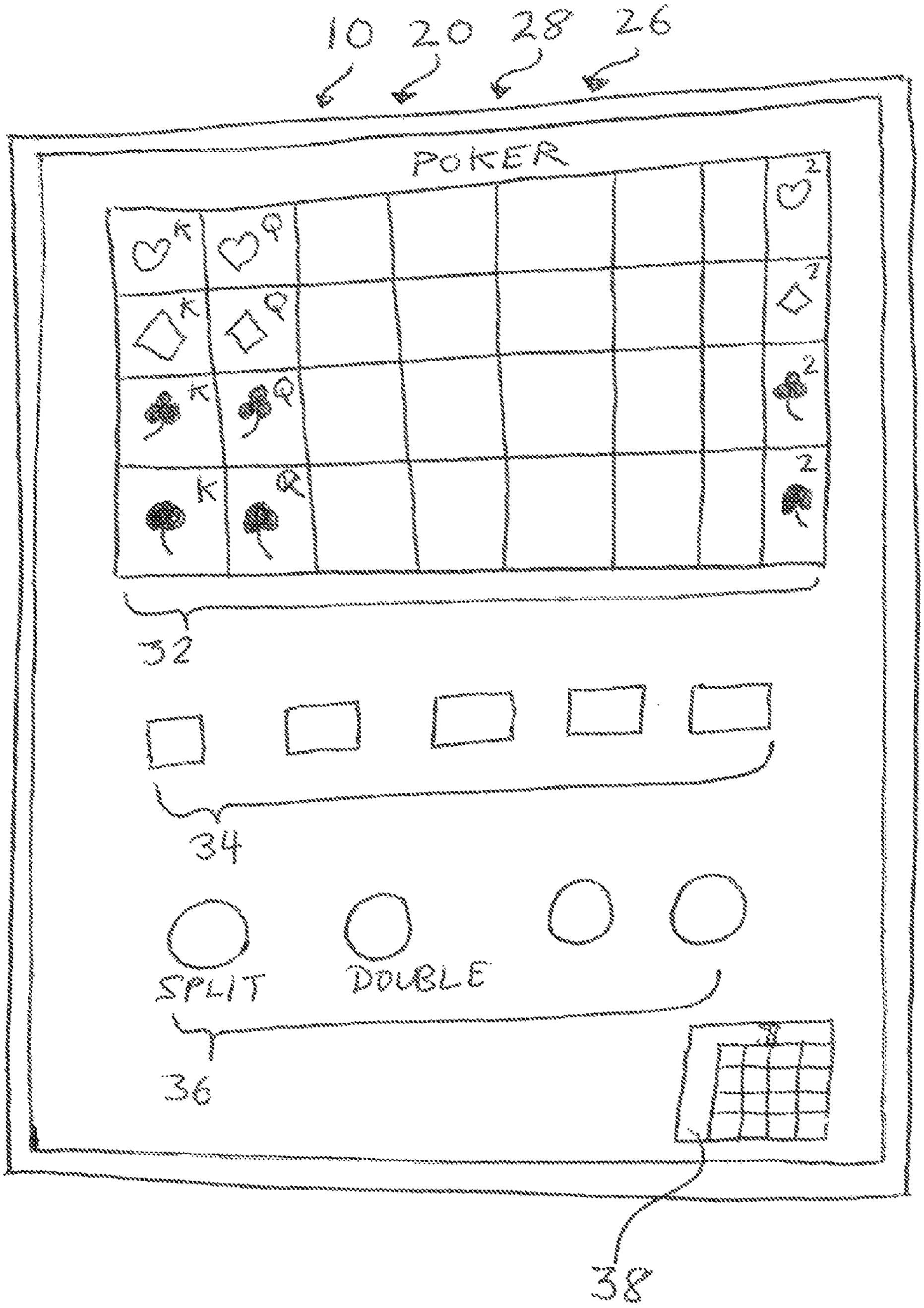
FIG. 4 could substantially show a view of one possible visual presentation for the playing card game embodiment of the present invention.

As substantially shown in FIG. 4 for various player card games, the electronic gaming system 20 could provide a visual presentation upon a user interface 28 utilize gaming symbols 30 that look like playing cards of one card deck (or multiple card decks-depending on what card game is being played). The electronic gaming system 20 through a user interface (e.g., a touch screen) 28 could visually present or otherwise communicate to a player (not shown) by suitable demarcation (e.g., designation), an arrangement of a first set of spaces (e.g., grid of demarcated squares) 32 for the selection of playing card gaming symbols 30 (e.g., for use in game play by the player and/or for use as winning gaming symbols.)

As noted above, this first set of spaces 32 could be also used by the player to select replacement gaming symbols 30 for discarded gaming symbols (e.g., playing cards). In one version, the first set of spaces 32 could have respective gaming symbols 30 reassigned (e.g., randomly) to the various spaces with the set without disclosing the identity or value of the gaming symbol 30 so re-assigned to a particular space. The identity or value of the selected replacement gaming symbols 30 being disclosed only after the selection is completed.

Proximate to the first set of spaces (gaming symbols) 32 could be second set of one or more other gaming symbol spaces 34 allotted to present those playing cards gaming symbols, which are used as the player's hand of cards in play of the game. Other embodiments of the invention 10 could use additional second sets of spaces 34 to show the gaming symbols used by the player to play the game with several hands of cards (not shown.)

A third set of spaces 38 provided by the presentation could be further assigned and designated for the player to use in gaming, wagering, and other suitable functions such as information transmission (e.g., regarding wagering/gaming instruction, payout table data, and other suitable system information communications).

Figure 5:
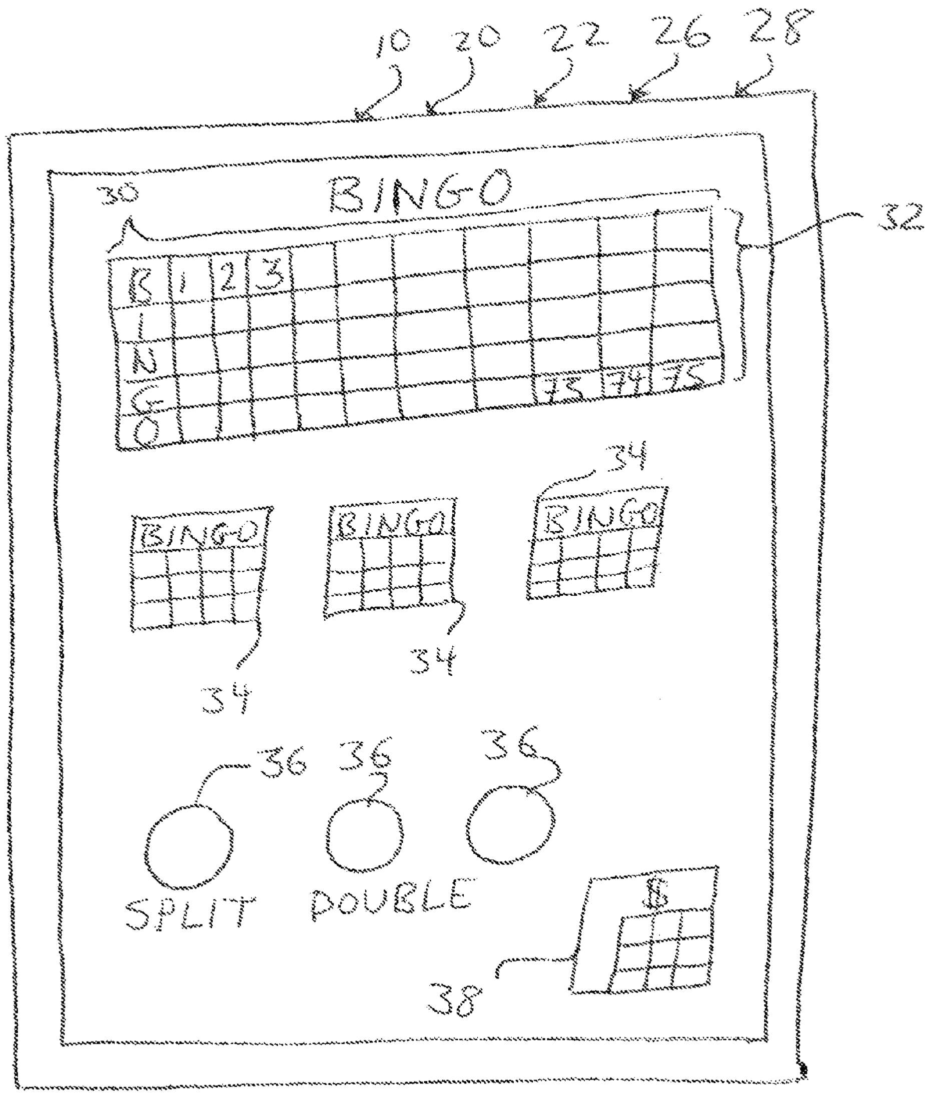
FIG. 5 is substantially a view of one possible visual presentation for the BINGO game embodiment of the present invention.

As substantially shown in FIG. 5, the embodiment of the invention 10 for playing BINGO games, the electronic gaming system 20 could utilize those gaming symbols 30 that are used in the call of BINGO game (e.g., the numerals from 1 to 75.) The electronic gaming system 20, through a user interface (e.g., a touch screen) 28, could visually present or otherwise communicate to a player by suitable demarcation (e.g., designation) a first set of spaces (e.g., grid of demarcated squares) for the selection of gaming symbols.

In at least one embodiment, a set of spaces 34 could demarcated and allotted to allow the player to select a BINGO winning pattern(s) for the play of a game. It should be noted that depending on the pattern pick, the game's payout table could be automatically adjusted by the electronic gaming system 20 to reflect appropriate odds and payouts for associated BINGO wins.

Proximate to the first set of gaming symbol spaces 32 could be a second set of spaces 34 allotted to present one or of those gaming symbols (e.g., bingo playing cards) for player's use in play of the game. Additional sets of spaces 36, 38 on the user interface 28 could be assigned and designated for the player to use in wagering and other suitable functions.

Generally, in the operation (e.g., after the player has entered its wager(s) for the game) the electronic gaming system 20 could first randomly select a definite number of BINGO playing cards for the use of the player without disclosing to the player the arrangement of gaming symbols on the individual BINGO cards assigned to the player. Either the player or system could then select the winning BINGO play pattern(s) for the play of the game. The electronic gaming system 20 could then present the payout table as adjusted for that particular play pattern. The player, then could start picking (e.g., calling the BINGO numbers) from the first set of gaming symbols (e.g., the numbers 1-75 presented on the grid), the value and identity of the gaming symbols being disclosed to the player, to start the play of game.

The electronic gaming system 20 could automatically monitor game play for all the BINGO cards assigned to the player as the player selects the winning gaming symbols for the game. The invention 10 could track as a gaming symbol spaces on an assigned BINGO card 34 as it matches a called number (e.g., player-selected gaming symbols for use in the play of the game) to the point that a BINGO win is established (e.g., the player assigned BINGO card is filled in or its "daubed" spaces to match a pre-selected BINGO pattern for a win.) When a player's BINGO card wins, the invention 10 could cause that particular player assigned BINGO card then to be displayed to the player along with that card's gaming symbols and its "daubed" winning pattern on the user interface 28 or otherwise communicate to the player the existence of such a winning BINGO card.

Generally, the game play is completed after the player has called all the BINGO numbers, the electronic gaming system completing the processing of all winning assigned BINGO cards and associated winning wagers to pay out or other wise accredit the player with win(s). The invention could then reset to allow the player to play another BINGO game if so desired or the player could quit the invention 10.

Figure 6:
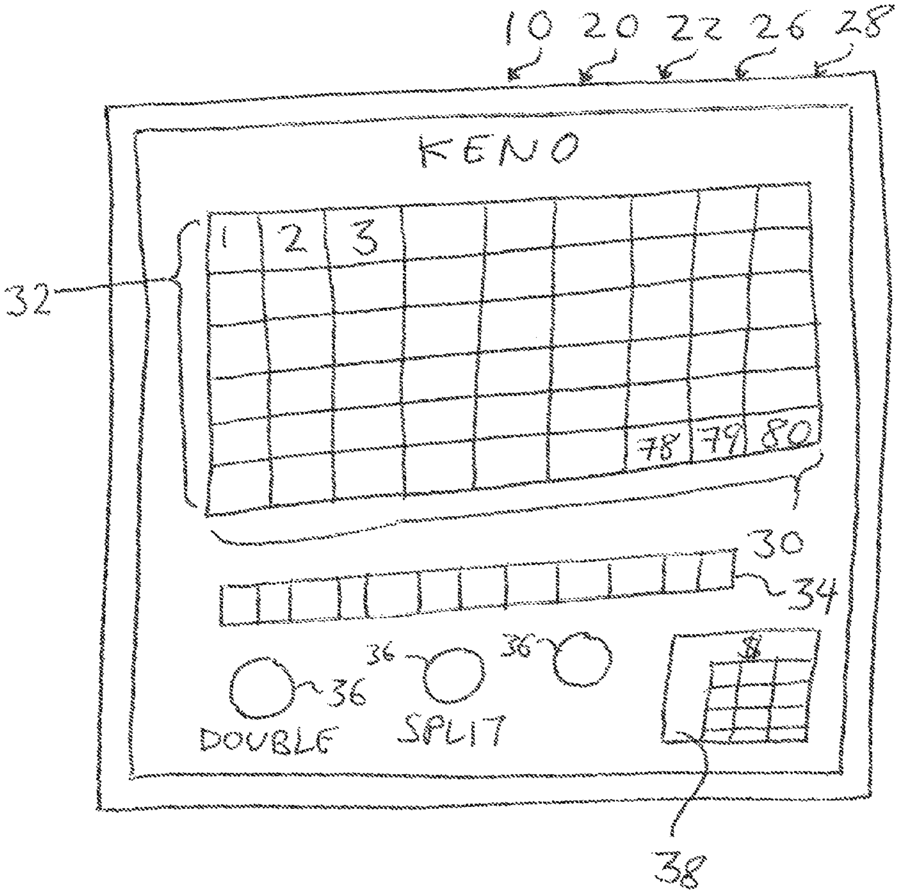
FIG. 6 is substantially a view of one possible visual presentation for the Keno embodiment of the present invention.
Figure 7:
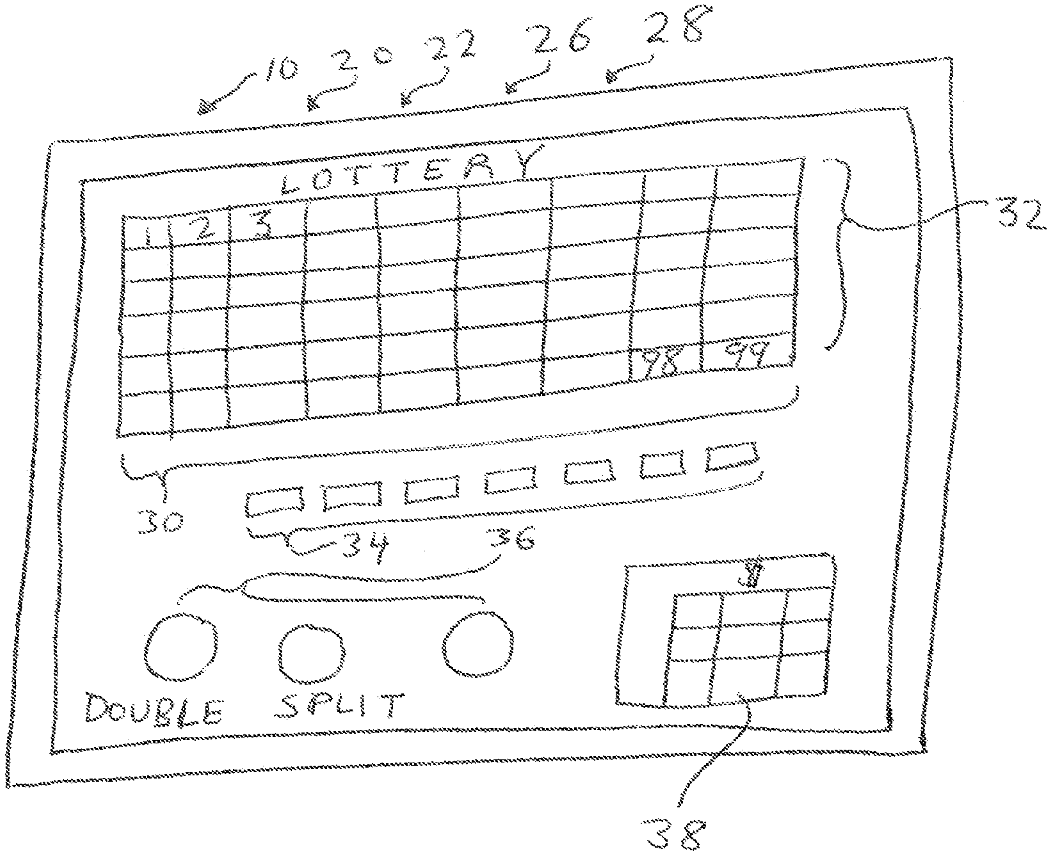
FIG. 7 is substantially a view of a one possible visual presentation for the Lottery embodiment of the present invention.

As substantially shown in FIGS. 5 and 6, for various electronic versions of KENO and lottery (e.g., state-run) games, the invention 10 for said games could respectively utilize gaming symbols 30 which are used in KENO (i.e., generally the numbers from 1 to 80) or for Lottery (e.g., generally from 1 to 99.)

The electronic gaming system 20 through a user interface (e.g., a touch screen) 28 could visually present or otherwise communicate to a player an arrangement having first set of spaces (e.g., grid of demarcated squares) 32 for selection of gaming symbols (e.g., as used by the player for game play or for use as winning playing card symbols.)

Proximate to the first set of spaces 32 symbols could be a second set of one or more other gaming symbol spaces 34 also demarcated and allotted to present those gaming symbols 32 assigned for player's use in play of the game. Additional sets of spaces on the touch screen could be assigned and designated for the player to use in wagering and other suitable functions 36. Still additional sets of spaces 38 displayed on the user interface could further assigned and designated for information transmission to player such as presentation of wagering/gaming instruction, payout table, and other suitable system communications to the player (not shown).

In operation, the invention 10 in one version (for these two games of KENO and lottery) could have the electronic gaming system 20 randomly select those gaming symbols 30 for use by the player in the play of the game (the electronic gaming system 20 not disclosing the identity or the value of said selected gaming symbols to the player at this time.) The first set of spaces 32 presented could then be used by the player to select winning gaming symbols. Each space could be assigned a gaming symbol with no two spaces having the same gaming symbol. The value and/or identity of all the gaming symbols of the first set of spaces 32 as presented being fully known to the player at this time.

In another version (for these two games), the invention 20 allows the player (knowing the identity and value of gaming symbols 30 as assigned to the respective spaces) to use the first set of spaces 32 for a different purpose, not to select the winning gaming symbols, rather to select the gaming symbols to be used by the player for the play of the game. Once the player has selected the gaming symbols to be used by the player for the play of the game, the invention 10 may cause the gaming symbols for the first set of spaces 32 to be reassigned (e.g., randomly) to the spaces (i.e., no two spaces having the same gaming symbol) without disclosing the identity or value of gaming symbol as assigned to a space. The player, not knowing the value or identity of a gaming symbol 30 as assigned to a particular space, then uses the first set of spaces 32 with re-assigned gaming symbols to select the winning gaming symbols. Depending on the setup of the game, the number of times a player selects a winning gaming symbols may be less, same as or more than the number of gaming symbols 30 that the player is using to play the game.

In both versions, once the gaming symbols 30 used by the player for the play of game and the winning game symbols have been appropriately selected, the electronic gaming system 20 could then reveal to the player the identity and/or value of the any selected gaming symbol 30 previously not disclosed to the player. The invention 10 may have the electronic gaming system 20 also compare the two sets of selected gaming symbols to determine whether the winning criteria for the game and/or wager(s) has been met. If a game/wager has been won, the electronic gaming system 20 may further credit or payout to the player according to a payout table means used for that particular game. The invention 10 then may then reset, allowing the player to play another game or quit the invention 10.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the example. As shown in the present Application, the invention may be a methodology for playing games wherein the player may select those gaming symbols used in the game to determine if the game's winning criteria are met. The invention may also allow the player to pick those gaming symbols as used by the player in the play of the game. Both of these features as provided by the invention can be seen as increasing the excitement and enjoyment of playing these games and enhancing their attraction to gaming public.

What is claimed is:

1. A method for operating an electronic gaming device comprising at least one processor, at least one display device, and at least one input device, the method comprising:

(A) displaying a user interface on said at least one display device, the user interface enabling a player to communicate with the electronic gaming device via the at least one input device;

(B) displaying a visual presentation to the player, the visual presentation including a plurality of game spaces, each game space is assigned, via at least one processor, one gaming symbol from a plurality of gaming symbols, wherein no two or more game spaces are assigned the same gaming symbol from the plurality of gaming symbols, and wherein the assignment of each gaming space with a respective gaming symbol is known and displayed to the player;

(C) selecting by the player, via the user interface, a first quantity of gaming spaces from the plurality of gaming spaces, wherein a set of gaming symbols comprising the gaming symbols associated with the selected gaming spaces defines a player-selected set of first gaming symbols;

(D) displaying, via the at last one display device, the plurality of gaming spaces, wherein each gaming space is randomly reassigned, via the at least one processor, one of the plurality of gaming symbols, wherein again no two or more of the gaming spaces are assigned the same gaming symbol from the plurality of gaming symbols, and wherein the assignment of each gaming space with a respective gaming symbol is unknown and not displayed to the player;

(E) selecting by the player, via the user interface, a second quantity of gaming spaces from the plurality of reassigned gaming spaces, wherein a set of unknown gaming symbols associated with the selected reassigned gaming spaces defines a player-selected set of second gaming symbols;

(F) displaying, via the at least one display device, the identity of the player-selected set of second gaming symbols whose identity was previously unknown to the player; and (G) comparing, via the at least one processor, the player-selected set of first gaming symbols with the player-selected set of second gaming symbols to determine if any matching occurred between the player-selected set of first gaming symbols and the player-selected set of second gaming symbols, the matching being used to determine if the player has won the game.

2. The method for operating an electronic gaming device of claim 1 further comprising a step of discarding one or more gaming symbol from the player-selected set of second gaming symbols.

3. The method for operating an electronic gaming device of claim 2 further comprising a step of selecting by the player, via the user interface, a third quantity of gaming spaces from the plurality of reassigned gaming spaces, wherein a set of unknown gaming symbols associated with the selected reassigned gaming spaces defines a player-selected set of third gaming symbols that replaces the one or more gaming symbols discarded from the player-selected set of second gaming symbols.

4. The method for operating an electronic gaming device of claim 3 further comprising a step of displaying, via the at least one display device, the identity of the player-selected set of third gaming symbols whose identity was previously unknown to the player.

5. The method for operating an electronic gaming device of claim 4 further comprising the step of wagering, via the user interface, prior to displaying the identity of the player-selected set of third gaming symbols.

6. The method for operating an electronic gaming device of claim 5 further comprising the step of wagering, via the user interface, prior to selecting of the player-selected set of third gaming symbols.

7. The method for operating an electronic gaming device of claim 1 further comprising the step of wagering, via the user interface, prior to displaying the identity of the player-selected set of second gaming symbols.

8. The method for operating an electronic gaming device of claim 7 further comprising the step of wagering, via the user interface, prior to the selection of player-selected set of second gaming symbols.

9. The method for operating an electronic gaming device of claim 8 further comprising the step of wagering, via the user interface, prior to the selection of player-selected set of first gaming symbols.

10. The method for operating an electronic gaming device of claim 1, wherein the gaming symbols are a set of symbols for use in BINGO.

11. The method for operating an electronic gaming device of claim 10 further comprising of selecting at least one BINGO card winning pattern.

12. The method for operating an electronic gaming device of claim 11, wherein the player-selected set of first gaming symbols are the symbols selected for the call of the game of BINGO and the player-selected set of second gaming symbols are symbols that populate at least one BINGO card.

13. The method for operating an electronic gaming device of claim 12, wherein the comparing, via the at least one processor, the player-selected set of first gaming symbols with the player-selected set of second gaming symbols to determine if matches occurred between the player-selected set of first gaming symbols and the player-selected set of second gaming symbols includes completing the selected at least one BINGO card winning pattern to be used to determine if the player has won the game.

14. The method for operating an electronic gaming device of claim 11, wherein the player-selected set of first gaming symbols are symbols that populate at least one BINGO card and the player-selected set of second gaming symbols are symbols selected for a call of the game of BINGO.

15. The method for operating an electronic gaming device of claim 14, wherein the comparing, via the at least one processor, the player-selected set of first gaming symbols with the player-selected set of second gaming symbols to determine if matches occurred between the player-selected set of first gaming symbols and the player-selected set of second gaming symbols includes completing the selected at least one BINGO card winning pattern to be used to determine if the player has won the game.

16. The method for operating an electronic gaming device of claim 1, wherein the gaming symbols are a set of numerals for use in Keno or Lottery.

17. The method for operating an electronic gaming device of claim 1, wherein the gaming symbols are playing cards.

18. The method for operating an electronic gaming device of claim 17, wherein the displaying a visual presentation to the player further has the gaming symbols presented by suits.

19. The method for operating an electronic gaming device of claim 18, wherein the gaming symbols within each respective suit are being further presented in an order based on the ranking of values of the gaming symbols within the suit.

* * * * *